US009532256B2

(12) United States Patent
Ariyavisitakul et al.

(10) Patent No.: US 9,532,256 B2
(45) Date of Patent: Dec. 27, 2016

(54) RECEIVER-AIDED MULTI-USER MIMO AND COORDINATED BEAMFORMING

(71) Applicant: Broadcom Corporation, Irvine, CA (US)

(72) Inventors: Sirikiat Ariyavisitakul, Alpharetta, GA (US); Daewon Lee, Suwanee, GA (US)

(73) Assignee: Broadcom Corporation, Irvine, CA (US)

(*) Notice: Subject to any disclaimer, the term of this patent is extended or adjusted under 35 U.S.C. 154(b) by 129 days.

(21) Appl. No.: 14/334,340

(22) Filed: Jul. 17, 2014

(65) Prior Publication Data

US 2015/0043450 A1    Feb. 12, 2015

Related U.S. Application Data

(60) Provisional application No. 61/863,371, filed on Aug. 7, 2013, provisional application No. 61/887,198, filed on Oct. 4, 2013.

(51) Int. Cl.
    *H04B 7/06*          (2006.01)
    *H04W 24/10*      (2009.01)
    *H04B 7/04*          (2006.01)
    *H04B 7/02*          (2006.01)

(52) U.S. Cl.
CPC ............ *H04W 24/10* (2013.01); *H04B 7/024* (2013.01); *H04B 7/0452* (2013.01); *H04B 7/0486* (2013.01); *H04B 7/063* (2013.01); *H04B 7/0626* (2013.01); *H04B 7/0632* (2013.01); *H04B 7/0639* (2013.01)

(58) Field of Classification Search
CPC ... H04B 7/0452; H04B 7/0626; H04B 7/0632; H04B 7/063; H04B 7/0456; H04W 24/10
See application file for complete search history.

(56) References Cited

U.S. PATENT DOCUMENTS

| 2012/0002612 A1* | 1/2012 | Baker | H04B 7/0417 370/328 |
| 2013/0163544 A1* | 6/2013 | Lee | H04W 72/04 370/329 |
| 2014/0204770 A1* | 7/2014 | Mondal | H04W 24/00 370/252 |

(Continued)

*Primary Examiner* — Hoon J Chung
(74) *Attorney, Agent, or Firm* — Sterne, Kessler, Goldstein & Fox PLLC

(57) ABSTRACT

Embodiments include systems and methods for improving the beamforming efficiency of Multi-User Multiple Input Multiple Output (MU-MIMO) and/or Coordinate Beamforming (CB) in wireless multi-access networks. In one aspect, a receiver-aided approach for MU-MIMO and/or CB is provided. Unlike conventional MU-MIMO/CB operation which is transparent to the UE, the receiver-aided approach herein makes information about potential MU-MIMO and/or CB multi-user interference available to UEs being considered for MU-MIMO and/or CB transmission. As such, the UEs can provide Channel State Information (CSI) that is better tailored to actual data transmission conditions than in conventional operation, and the base station can make better decisions regarding MU-MIMO and/or CB operation, user selection, and transmission parameters (e.g., number of data streams, precoder matrix, etc.).

20 Claims, 5 Drawing Sheets

(56) References Cited

U.S. PATENT DOCUMENTS

2015/0016379 A1\* 1/2015 Nam ................... H04B 7/0456
370/329
2015/0146618 A1\* 5/2015 Ko ....................... H04B 7/0626
370/328

\* cited by examiner

RECEIVER-AIDED MULTI-USER MIMO AND COORDINATED BEAMFORMING

CROSS-REFERENCE TO RELATED APPLICATION(S)

The present application claims the benefit of U.S. Provisional Application No. 61/863,371, filed Aug. 7, 2013, and U.S. Provisional Application No. 61/887,198, filed Oct. 4, 2013, both of which are incorporated herein by reference in their entireties.

BACKGROUND

Technical Field

The present disclosure relates generally to a receiver-aided approach for multi-user Multiple Input Multiple Output (MU-MIMO) and/or Coordinated Beamforming (CB).

Background Art

In Multi-User Multiple Input Multiple Output (MU-MIMO), a base station utilizes multiple transmit antennas to service a plurality of User Equipments (UEs) on the same time-frequency resources. To reduce interference between the multiple transmitted data streams, the base station precodes the data streams before transmission to create spatially orthogonal paths from the base station to the various UEs served by the MU-MIMO data transmission. In Coordinated Beamforming (CB), multiple base stations coordinate to beamform respective transmissions to multiple UEs with reduced interference.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

For purposes of this discussion, the term "module" shall be understood to include at least one of software, firmware, and hardware (such as one or more circuits, microchips, processors, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

For the purposes of this discussion, the term "processor circuitry" shall be understood to include one or more: circuit(s), processor(s), or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal or external memory to retrieve instructions stored in the memory, which when executed by the processor, perform the corresponding function(s) associated with the processor.

In the following disclosure, terms defined by the Long-Term Evolution (LTE) standard are sometimes used. For example, the term "eNodeB" or "eNB" is used to refer to what is commonly described as base station (BS) or base transceiver station (BTS) in other standards. The term "User Equipment (UE)" is used to refer to what is commonly described as a mobile station (MS) or mobile terminal in other standards. However, as will be apparent to a person of skill in the art based on the teachings herein, embodiments are not limited to the LTE standard and can be applied to other wireless communication standards, including, without limitation, WiMAX, WCDMA, WLAN, and Bluetooth.

Figure 1:
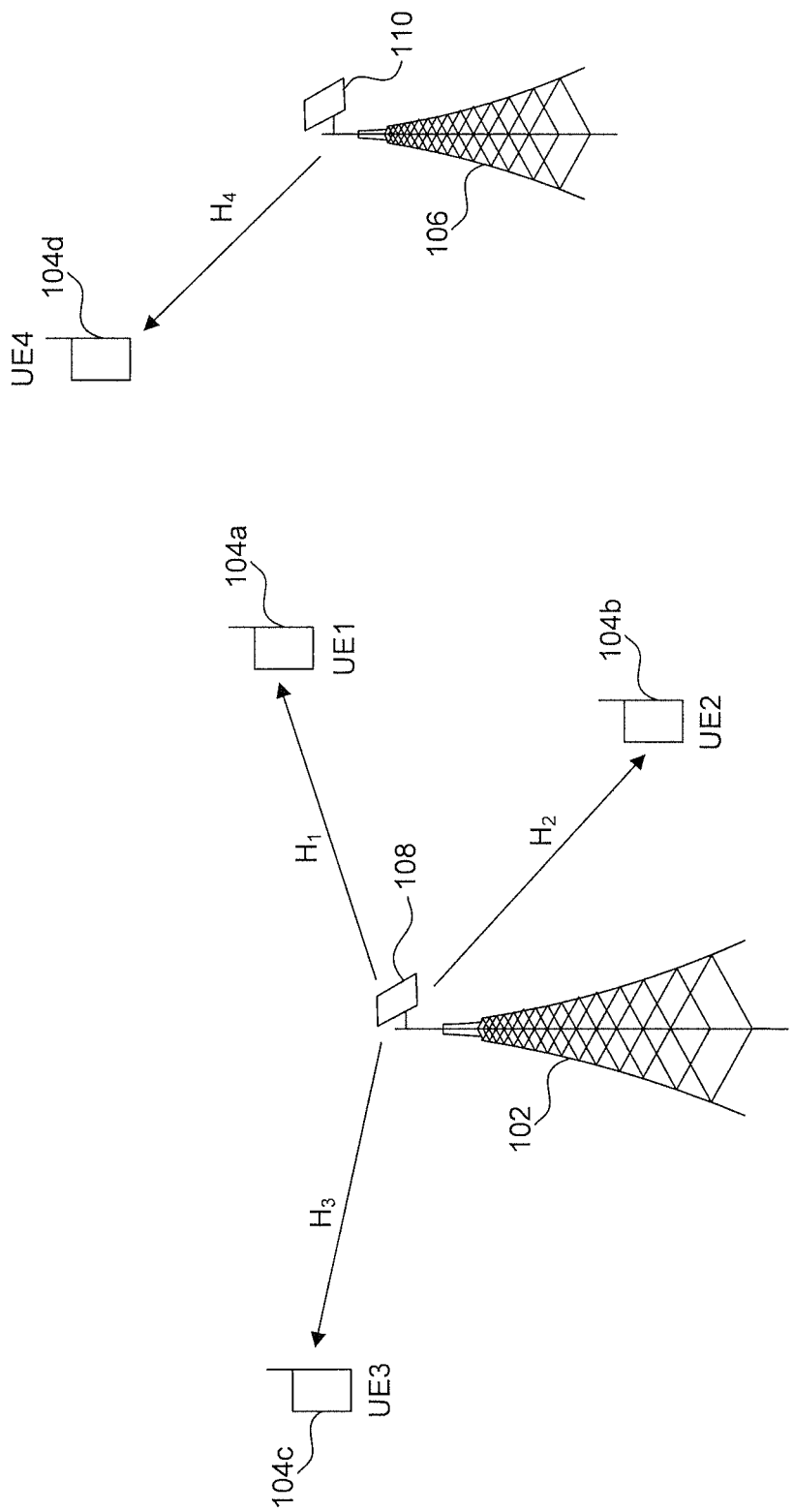
FIG. 1 illustrates an example environment in which embodiments can be practiced or implemented.

FIG. 1 illustrates an example environment 100 in which embodiments can be practiced or implemented. Example environment 100 is provided for the purpose of illustration only and is not limiting of embodiments. As shown in FIG. 1, example environment 100 includes, without limitation, a first base station 102, a second base station 106, and a plurality of user equipments (UEs) 104a, 104b, 104c, and 104d. For the purpose of illustration, it is assumed that base station 102 serves UEs 104a, 104b, and 104c and that base station 106 serves UE 104d. Further, it is assumed that base stations 102 and 106 are near each other such that transmission by one may cause interference at one or more UEs served by the other. For example, signals transmitted by base station 106 to UE 104d may interfere at UE 104a with signals transmitted by base station 102 to UE 104a.

Base stations 102 and 106 can each be a cellular network base station, such as an LTE eNB, a WCDMA Node B, or a WiMAX base station, for example. Alternatively, base stations 102 and 106 can each be a wireless network access point (AP), such as a WLAN or a Bluetooth AP, for example. Base stations 102 and 106 can be homogeneous (having similar capabilities, e.g., maximum transmit power, number of transmit/receive antennas, etc.) or heterogeneous (having different capabilities).

In an embodiment, base stations 102 and 106 can each include a plurality of antennas that form a respective Multiple Input Multiple Output (MIMO) antenna array 108 and 110. MIMO antenna array 108 or 110 can be used to perform MIMO transmission to one or more UEs served by the base station. In an embodiment, MIMO antenna array 108 and/or 110 is a Massive MIMO (M-MIMO) antenna array, which includes a significantly larger number of antennas than available in existing base station implementations (which can be up to 8 antenna elements). For example, M-MIMO antenna array 108 and/or 110 can include 16, 32, 64 or more antenna elements.

Figure 2:
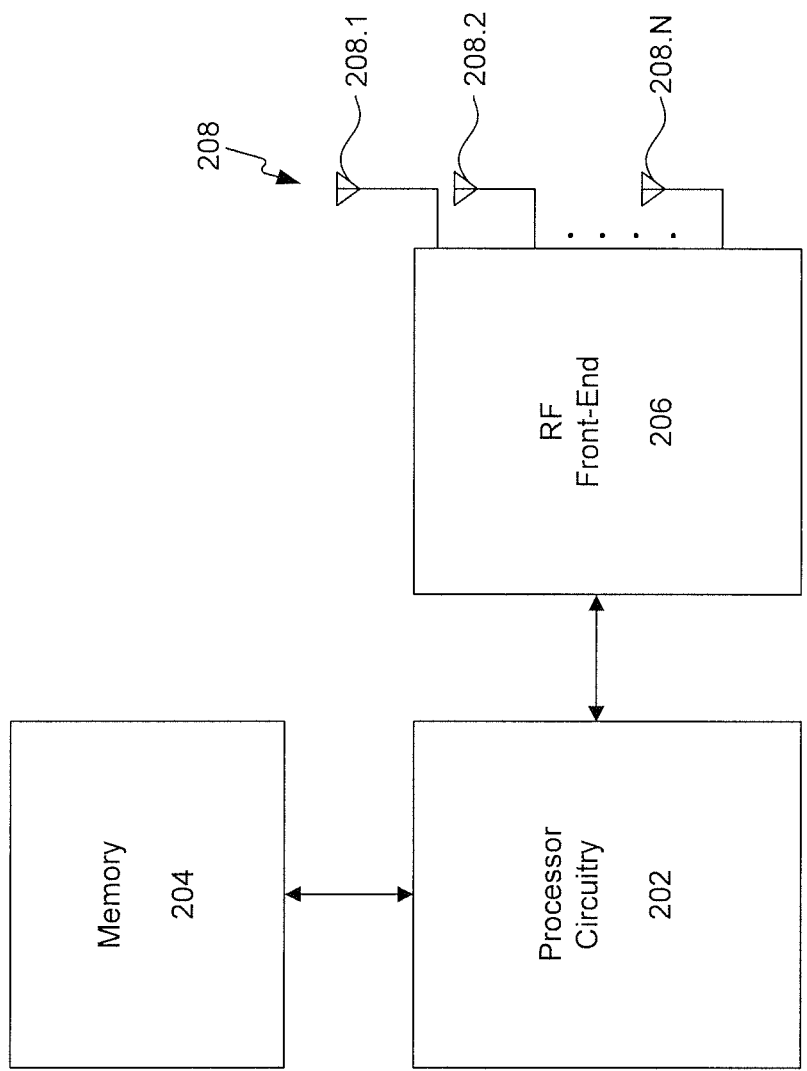
FIG. 2 illustrates an example base station according to an embodiment.

In an embodiment, base stations 102 and 106 can each be implemented as illustrated by example base station 200 shown in FIG. 2. Example base station 200 is provided for the purpose of illustration only and is not limiting of embodiments. As shown in FIG. 2, example base station 200 includes a processor circuitry 202, a memory 204, a radio frequency (RF) front-end circuit 206, and an antenna array 208 including a plurality of antenna elements 208.1, 208.2, . . . , 208.N. Processor circuitry 202 can be implemented as described above and can be configured to perform the base station functionalities described herein. In an embodiment, processor circuitry 202 executes logic instructions stored in memory 204 to perform the functionalities described herein. RF front-end circuit 206 includes digital and/or analog circuitry that perform transmit and receive RF processing, including filtering, power amplification, frequency up-conversion, frequency down-conversion, etc. Together with antenna array 208, RF front-end circuit 206 forms a transceiver circuit for transmitting and receiving signals by base station 200. In an embodiment, the transceiver circuit can be controlled by processor circuit 202 to transmit/receive at specific time-frequency resource element(s) (physical resource element(s)). For example, as further described below, the transceiver circuit can be used to signal information to a UE in specific physical resource elements.

Returning to FIG. 1, in an embodiment, base station 102 can use MIMO antenna array 108 to beamform transmissions to one or more of UEs 104a, 104b, and 104c. In Single-User MIMO (SU-MIMO), base station 102 can beamform one or more data streams (also referred to as "layers") to a single UE in a transmission that occupies a given set of physical resource elements. In Multi-User MIMO (MU-MIMO), base station 102 can beamform two or more data streams to two or more UEs in a transmission that occupies a given set of physical resource elements, while further reducing interference between UEs (multi-user interference, interference at a UE caused by the transmission of one or more data streams for one or more other UEs). In Coordinated Beamforming (CB), base station 102 can coordinate with base station 106 to beamform respective transmissions to their respective UEs while also reducing multi-user interference. For example, base station 102 can coordinate with base station 106 so that base station 102 can beamform a first transmission to UE 104a on the same set of physical resource elements used by base station 106 to beamform a second transmission to UE 104d, with reduced or no multi-user interference at UEs 104a and 104d.

In order to beamform a transmission to one or more of UEs 104a, 104b, and 104c, while also suppressing multi-user interference, base station 102 must have knowledge of the downlink channels of the UEs affected by the transmission (UEs for which the transmission is intended and, optionally, UEs that can experience multi-user interference due to the transmission). For example, to beamform to UEs 104a, 104b, and 104c, base station 102 should have knowledge of downlink channels $H_1$, $H_2$, and $H_3$ illustrated in FIG. 1. Knowledge of the downlink channel from base station 102 to UE 104d can be used to further suppress interference due to the transmission at UE 104d.

In a TDD (Time Division Duplexing) mode embodiment (where downlink and uplink transmissions are time-multiplexed on the same frequency band), base station 102 can estimate the downlink channels to UEs 104a, 104b, and 104c based on respective estimates of the uplink channels from UEs 104a, 104b, and 104c to base station 102. Estimates of the uplink channels can be determined based on Sounding Reference Signals (SRS) and/or uplink Demodulation Reference Signals (DM-RS) transmitted by UEs 104a, 104b, and 104c to base station 102.

In an FDD (Frequency Division Multiplexing) mode embodiment (where downlink and uplink transmissions can occur simultaneously on different frequency bands), base station 102 can acquire knowledge about the downlink channels to UEs 104a, 104b, and 104c based on Channel State Information (CSI) reported by UEs 104a, 104b, and 104c during link adaptation. The CSI reported by a UE typically includes a Rank Index (RI) (which indicates a preferred number of data streams), a Precoding Matrix Indicator (PMI) (which is an index that identifies a preferred precoder matrix from a pre-determined precoder codebook), and a Channel Quality Indicator (CQI) (which is an index that identifies an estimated channel quality corresponding to the reported RI and PMI). Generally, the RI, PMI, and CQI are determined by the UE based on a UE-side estimate of the downlink channel to the UE, which can be computed by the UE using downlink reference signals transmitted by the base station. Typically, the RI, PMI, CQI are determined under an SU-MIMO assumption by the UE (i.e., that the UE will be the only recipient of the transmission).

After acquiring downlink channel knowledge, base station 102 determines a precoding matrix (the precoding matrix reduces to a vector when a single data stream is being beamformed) based on the downlink channel estimate(s) and/or the PMIs signaled by the UEs, and multiplies the data stream(s) by the precoding matrix to generate pre-coded signals. The pre-coded signals are then forwarded (after appropriate processing, including physical resource mapping and radio frequency processing) to MIMO antenna array 108 for transmission. In an embodiment, each of the pre-coded signals is coupled to a respective antenna of MIMO antenna array 108 for transmission.

In an embodiment, the precoding matrix is composed of precoder vector(s) (a column vector of the precoding matrix may correspond a precoder vector) and/or precoder matrix(ces) (a set of column vectors of the precoding matrix may correspond to a precoder matrix), with each precoder vector or matrix corresponding to a respective UE included (with one or more data stream) in the transmission. The precoder vector(s) and/or precoder matrix(ces) of the precoder matrix each corresponds to a precoder codeword selected from a pre-determined precoder codebook. For example, a first precoder vector of the precoding matrix (e.g., the first column vector of the precoding matrix) may correspond to a rank 1 precoder codeword for beamforming a single data stream to UE 104a, selected from a pre-determined rank 1 precoder codebook. A second and a third precoder vector (e.g., second and third column vectors of the precoding matrix, which together form a precoder matrix) of the precoding matrix may correspond to a rank 2 precoder codeword for beamforming two data streams to UE 104b, selected from a pre-determined rank 2 precoder codebook. For simplification, hereinafter, the term "precoder matrix" is used to refer to both a precoder vector (i.e., a rank 1 precoder codeword) and a precoder matrix (i.e., a rank 2 or higher precoder codeword).

The precoder codeword selected by base station 102 for a given data stream is typically based at least in part on the downlink channel to the UE for which the data stream is intended. For example, the precoder codeword may be the same as or based on the PMI signaled by the UE to base station 102. In another embodiment, base station 102 determines the precoder codeword based on an estimate of the downlink channel to the UE. For example, the precoder codeword may correspond to the precoder codeword (from the pre-determined codebook) that is closest to the eigenvector with the maximum eigenvalue of a matrix representing the downlink channel to the UE (the matrix is of size m×n, where m represents the number of receive antennas at the UE and n represents the number of transmit antennas at base station 102). Such a precoder codeword ensures that the data stream is transmitted to the UE in a spatial direction of the downlink channel having a maximum signal gain.

The efficiency of MU-MIMO and/or CB depends on various factors, but particularly on the ability of base station 102 to acquire accurate downlink channel information and to apply precoding that is closely tailored to the acquired downlink channel information. Conventionally, at least one of these conditions is not satisfied because base station 102 generally obtains a quantized (and therefore incomplete) version of downlink channel information (from reported PMIs/CQIs based on a SU-MIMO assumption) and/or is limited to selecting precoder vector(s) from a finite set of precoder codewords from a pre-determined codebook. Without the accurate downlink channel information necessary for suppressing multi-user interference, base station 102 relies on (best-effort) heuristic solutions in the selection of the precoder matrix, which can reduce beamforming efficiency through increased multi-user interference.

Embodiments, as further described below, include systems and methods for improving the beamforming efficiency of MU-MIMO and/or CB. In one aspect, embodiments include a receiver-aided (UE-aided) approach for MU-MIMO and/or CB. Unlike conventional MU-MIMO/CB operation which is transparent to the UE, the receiver-aided approach herein makes information about potential MU-MIMO and/or CB multi-user interference available to UEs being considered for MU-MIMO and/or CB transmission. As such, the UEs can provide CSI that is better tailored to actual data transmission conditions than in conventional operation, and the base station can make better decisions regarding MU-MIMO and/or CB operation, user selection, and transmission parameters (e.g., number of data streams, precoder matrix, etc.). In another aspect, embodiments include an approach for allowing a UE to estimate multi-user interference associated with a MU-MIMO and/or CB transmission, thereby enabling the UE to better suppress the multi-user interference. Both approaches, as further described below, can be combined to result in high efficiency MU-MIMO and/or CB, with reduced multi-user interference.

Figure 3:
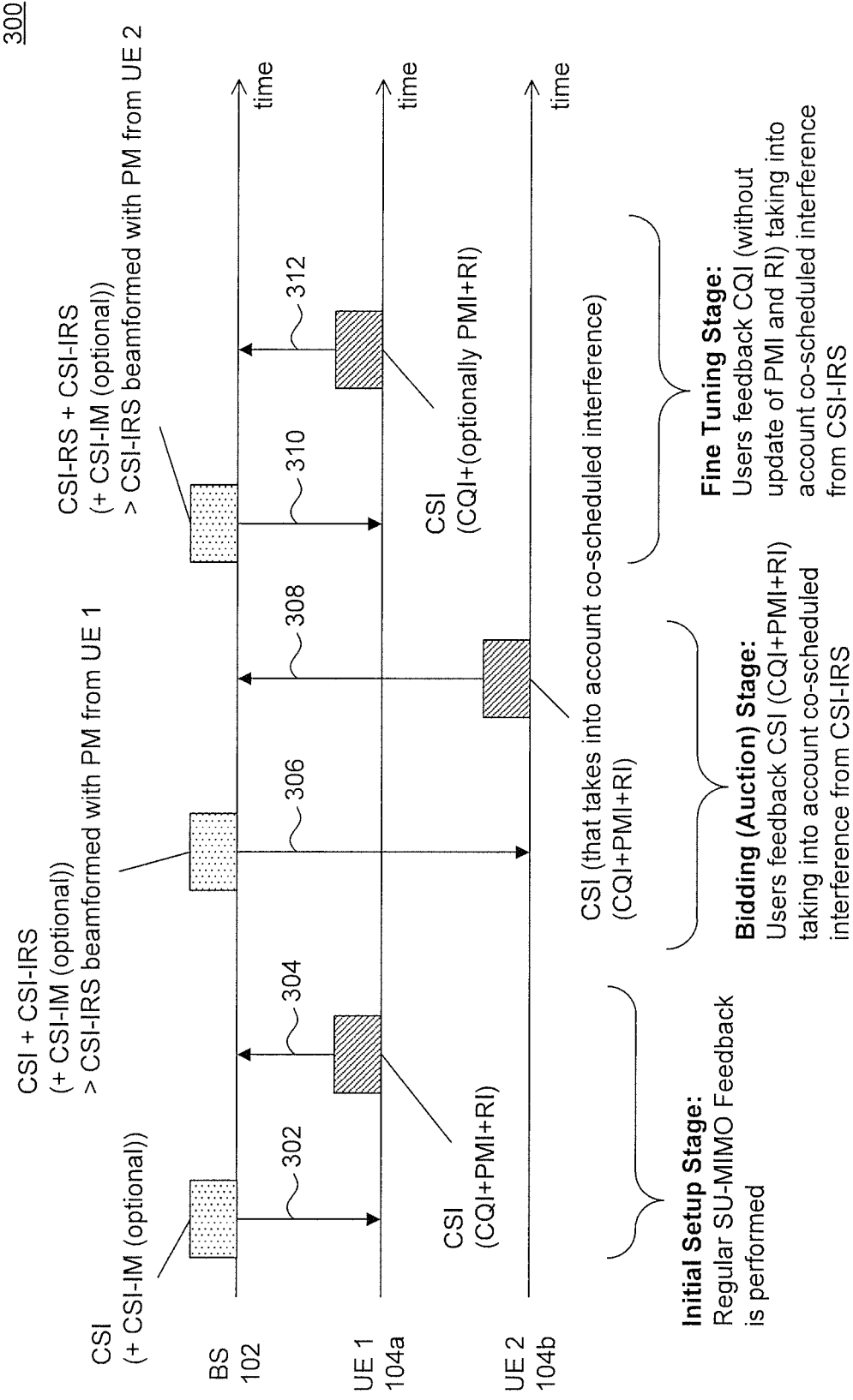
FIG. 3 is an example that illustrates a process for Multi-User MIMO (MU-MIMO) and/or Coordinate Beamforming (CB) according to an embodiment.

FIG. 3 is an example 300 that illustrates a process for MU-MIMO and/or CB according to an embodiment. Example 300 is provided for the purpose of illustration only and is not limiting of embodiments. For the purpose of illustration only, example 300 is described with respect to MU-MIMO, where a single base station 102 determines whether to use MU-MIMO transmission for a given physical resource element, and if MU-MIMO transmission is to be used, the UEs to be served by the MU-MIMO transmission. As would be understood by a person of skill in the art based on the teachings herein, the process illustrated by example 300 can be readily extended to CB transmission, where multiple base stations jointly decide whether to use CB transmission, and if CB is to be used, the UEs to be served by the CB transmission.

For the purpose of illustration only, example 300 is described with respect to a scenario involving only two UEs 104a and 104b. As will be apparent to a person of skill in the art based on the teachings herein, the process illustrated by example 300 is not limited to example 300, and can be readily extended to more than two UEs as further described below. In other words, MU-MIMO transmission for UEs up to the maximum number of users allowed by the relevant standard can be performed using the process described herein.

As shown in FIG. 3, the process illustrated by example 300 can include an initial setup stage, an optional bidding (auction) stage, and an optional fine tuning stage. The initial setup stage includes steps 302 and 304. In an embodiment, the initial setup stage is performed with respect to one or more UEs before the bidding stage is performed.

Step 302 includes base station 102 configuring UE 104a with CSI-Reference Signals (CSI-RS). The CSI-RS configuration defines a structure of the CSI-RS to be used by UE 104a to acquire channel state information. For example, the CSI-RS configuration can include the number of CSI-RS (e.g., one, two, four, or eight according to the LTE standard), the periodicity of the CSI-RS (e.g., 5 ms, 10 ms, etc.), and the exact location(s) of CSI-RS within a set of physical resource elements (in LTE, the CSI-RS configuration specifies exactly what resource elements from the 40 possible resource elements of a resource block pair are used for the up to eight CSI-RS in the resource block pair). In an embodiment, the CSI-RS configuration can further specify a CSI-Interference Management (CSI-IM) resource element for measuring interference. Base station 102 then transmits the CSI-RS in accordance with the CSI-RS configuration.

In response to the CSI-RS configuration, in step 304, UE 104a responds with CSI. The CSI as described above includes an RI, a PMI, and a CQI. The RI, PMI, and CQI are determined by UE 104a based on a UE-side estimate of the downlink channel from base station 102 to UE 104a, measured by UE 104a using the CSI-RS. Further, the RI, PMI, CQI are typically determined under an SU-MIMO assumption by the UE (i.e., that the UE will be the only recipient of the transmission). In an embodiment, CSI reports from multiple UEs can be received in response to the broadcast of a single CSI-RS in step 302.

In an embodiment, at the end of the initial setup stage, base station 102 can determine whether to perform MU-MIMO transmission, and if so, can select the UEs to include in the MU-MIMO transmission based on the received CSI reports. For example, in an embodiment, base station 102 can determine whether compatible PMIs have been reported by the UEs to determine whether to perform MU-MIMO transmission and the members of the MU-MIMO transmission. In one embodiment, base station 102 uses a compatibility lookup table in this determination. In another embodiment, base station 102 can proceed to the bidding stage and the fine tuning stage as further described below.

The bidding stage includes steps 306 and 308. In an embodiment, the bidding stage first includes selecting a UE of the available UEs as a first candidate for a MU-MIMO transmission. In an embodiment, the selection of the first candidate is based on the CQIs reported to the base station during the initial setup stage. For example, the base station may select as the first candidate the first UE to report a CQI above a threshold during the initial setup stage, or the UE reporting the maximum CQI during the initial setup stage. In example 300, base station 102 selects UE 104a as the first candidate of the MU-MIMO transmission.

After selecting the first candidate, steps 306 and 308 can be performed with respect to any number of available UEs to determine other candidates for the MU-MIMO transmission (up to the maximum allowed by the relevant standard).

In an embodiment, steps 306 and 308 are performed with respect to UEs that report a CQI above a threshold during the initial setup stage. In example 300, steps 306 and 308 are shown being performed with respect to UE 104b. However, steps 306 and 308 can be repeated for other available UEs, if any, as described above.

Step 306 includes base station 102 configuring UE 104b with a modified CSI-RS process configuration. In an embodiment, in addition to defining CSI-RS, the modified CSI-RS process configuration further specifies the location(s) of physical resource element(s) that can transport CSI-Interference Reference Signals (CSI-IRS) (CSI-IRS ports). The CSI-IRS for a given UE include reference signals that are beamformed with respective precoder matrices of potential interfering UEs. For example, in example 300, one of the CSI-IRS for UE 104b can be beamformed using a precoder matrix associated with UE 104a. The precoder matrix associated with UE 104a may correspond to the PMI reported by UE 104a during the initial setup stage. Assuming that a second candidate for the MU-MIMO transmission was also selected, then another CSI-IRS port for UE 104b can be beamformed using a precoder matrix associated with this second candidate.

In an embodiment, the CSI-IRS may occupy physical resource elements that are pre-defined by a CSI-RS configuration. In other words, one or more CSI-RS of a CSI-RS configuration can be replaced by CSI-IRS within the CSI-RS configuration. In another embodiment, the CSI-IRS physical resources are independent from the CSI-RS physical resources. In a further embodiment, base station 102 can configure UE 104b with CSI-IRS independently of the CSI-RS configuration of UE 104b.

After configuring UE 104b as described above, base station 102 transmits the CSI-RS and CSI-IRS in step 306. In step 308, UE 104b measures the CSI-IRS beamformed with the precoder matrix of UE 104a to estimate the interference due to UE 104a in a potential MU-MIMO transmission involving UEs 104a and 104b. In an embodiment, steps 306 and 308 can be repeated with respect to other selected candidates (other than UE 104a), if any, of the MU-MIMO transmission. As such, UE 104b can estimate multi-user interference due to one or more potential interfering UEs of the MU-MIMO transmission.

In another embodiment, instead of performing step 306, base station 102 signals the precoder matrix of UE 104a to UE 104b (e.g., base station 102 signals an index that identifies the precoder matrix). UE 104b uses the precoder matrix of UE 104a to estimate the interference due to UE 104a in a potential MU-MIMO transmission involving UEs 104a and 104b.

In an embodiment, base station 102 instructs UE 104b, e.g., during the modified CSI-RS process configuration, to generate and send a post-detection CSI report which takes into account potential multi-user interference estimated from CSI-IRS. In another embodiment, UE 104b automatically generates and sends such a post-detection CSI report in response to a modified CSI-RS process configuration (UE 104b assumes that there is always multi-user interference to be measured when configured using a modified CSI-RS process configuration). The post-detection CSI report thus includes an RI, PMI, and CQI calculated under the assumption of concurrent (on the same physical resource elements) transmission to one or more other UEs. In example 300, in step 308, UE 104b generates and sends to base station 102 a post-detection CSI report that takes into account estimated interference due to concurrent transmission to UE 104a. In an embodiment, UE 104b uses the estimated interference from CSI-IRS to derive interference suppressing receive antenna weights and computes the PMI and CQI based at least in part on the derived receive antenna weights.

In an embodiment, to accurately estimate the interference from the CSI-IRS, UE 104b should have knowledge of the exact bit sequence of the CSI-RS, the physical location(s) of CSI-RS within the time-frequency resource element grid, and the number of CSI-IRS ports (or the number of potential interfering spatial layers) that it should measure. The bit sequence of the CSI-IRS can be pre-configured into UE 104b or signaled to UE 104b by base station 102. The physical location(s) of the CSI-IRS can be indicated to UE 104b during the modified CSI-RS process configuration.

The number of CSI-IRS ports that UE 104b should measure to estimate interference can vary depending on channel conditions between base station 102 and available UEs. This is because multi-user interference at UE 104b is a function of the channel conditions. Typically, UE 104b is unaware of the number of UEs being co-scheduled with it. In an embodiment, suited for deployment scenarios where channel conditions are not anticipated to vary rapidly, base station 102 can be configured to indicate the exact number of CSI-IRS ports to measure to UE 104b during the modified CSI-RS process configuration. UE 104b would thus always measure the same number of CSI-IRS ports (e.g., first two ports) to estimate multi-user interference. In another embodiment, suited for deployment scenarios where channel conditions are expected to vary more rapidly, base station 102 can be configured to dynamically indicate the actual number of CSI-IRS ports to measure to UE 104b. In a further embodiment, base station 102 can signal to UE 104b the maximum number of CSI-IRS ports that it can transmit in a given set of physical resource elements (e.g., resource block pair) during the modified CSI-RS process configuration. Using this assumption, UE 104b is configured to blindly detect the actual number of transmitted CSI-IRS ports to estimate multi-user interference.

Generally, the CSI-RS and the actual data transmission are transmitted at different transmit powers by the base station. To enable CSI computation at the UE, the base station typically signals an energy per resource element (EPRE) ratio between the CSI-RS and the Physical Downlink Shared Channel (PDSCH) to all UEs. However, this ratio is based on an SU-MIMO assumption, where the total transmit power is allocated to a single data stream, and is inadequate for accurate interference estimation in a MU-MIMO scenario where the total transmit power is shared among a number of data streams (the number of which is unknown by the UE). Accordingly, in an embodiment, the base station can be configured to signal multiple EPRE ratios in MU-MIMO operation, one per UE. In one embodiment, the CSI-RS to PDSCH ratio for a UE is explicitly signaled by the base station to the UE, e.g., the base station may explicitly indicate along with an aperiodic trigger for PUSCH (Physical Uplink Shared Channel) CSI feedback the CSI-RS to PDSCH EPRE ratio assumption to be used during CSI computation. In another embodiment, the CSI-RS to PDSCH EPRE ratio assumption is tied to the indication of the use of CSI-IRS measurement. In other words, when the UE receives an indication from the base station to perform CSI-IRS measurement, it automatically assumes a pre-determined value for the CSI-RS to PDSCH EPRE ratio. Otherwise, the UE uses the ratio that is signaled by the base station for SU-MIMO operation.

Returning to example 300, after receiving the post-detection CSI report from UE 104b, in an embodiment, base station 102 can make an initial determination as to whether UE 104b can be a second candidate for the MU-MIMO transmission. In an embodiment, this initial determination is based on the CQI reported in the post-detection CSI. In another embodiment, base station 102 may receive post-detection CSI reports from multiple UEs (where steps 306 and 308 are repeated for multiple UEs) and can determine which of the reporting UEs to select as a candidate for the MU-MIMO transmission. In example 300, it assumed that base station 102 has determined that UE 104b can be a second candidate for the MU-MIMO transmission based on the initial determination. Otherwise, base station 102 may drop UE 104b as a potential candidate and consider other UEs or perform SU-MIMO transmission to UE 104a.

Subsequently, the process illustrated in example 300 proceeds to the fine tuning stage, which includes steps 310 and 312. In step 310, base station 102 configures UE 104a with a modified CSI-RS process configuration in the same manner described above with respect to UE 104b. Specifically, one of the CSI-IRS for UE 104a is beamformed using a precoder matrix associated with UE 104b. The precoder matrix associated with UE 104b may correspond to the PMI reported by UE 104b in the post-detection CSI report transmitted in step 308 to base station 102.

UE 104a uses the CSI-RS to estimate interference due to a concurrent transmission to UE 104b in a potential MU-MIMO transmission as described above, and sends an updated CSI report in step 312 to base station 102. In an embodiment, the updated CSI report can be according to one of two modes. In a first mode, the updated CSI report includes an updated CQI based on the interference estimated from the CSI-IRS but assumes the RI and PMI are maintained the same as in a previously reported CSI (in an embodiment, the base station can indicate to the UE which previously reported RI and PMI to assume). The RI and PMI may or may not be included in the updated CSI report in this mode. In a second mode, the updated CSI report includes updated RI, PMI, and CQI based on the estimated interference. The updated RI and PMI may correspond to the RI and PMI that achieve a desired performance (e.g., minimum multi-user interference) based on the estimated interference.

After receiving the updated CSI report from UE 104a, base station 102 may perform further fine tuning or decide whether to include UE 104b as a second candidate for the MU-MIMO transmission. For example, in an embodiment, base station 102 may repeat steps 310 and 312 with respect to UE 104b using an updated PMI from UE 104a. Upon receiving an updated CQI from UE 104b, base station 102 can make a final determination as to whether to include UE 104b in the MU-MIMO transmission. In another embodiment, base station 102 determines whether the updated CQI from UE 104a remains above a threshold, and if so, selects UE 104b as a second candidate for the MU-MIMO transmission. Otherwise, base station 102 may drop UE 104b as a potential candidate and consider other UEs or perform SU-MIMO transmission to UE 104a. As described above, base station 102 can repeat the process described in example 300 for additional UEs as desired, for example to add a third candidate for the MU-MIMO transmission.

Figure 4:
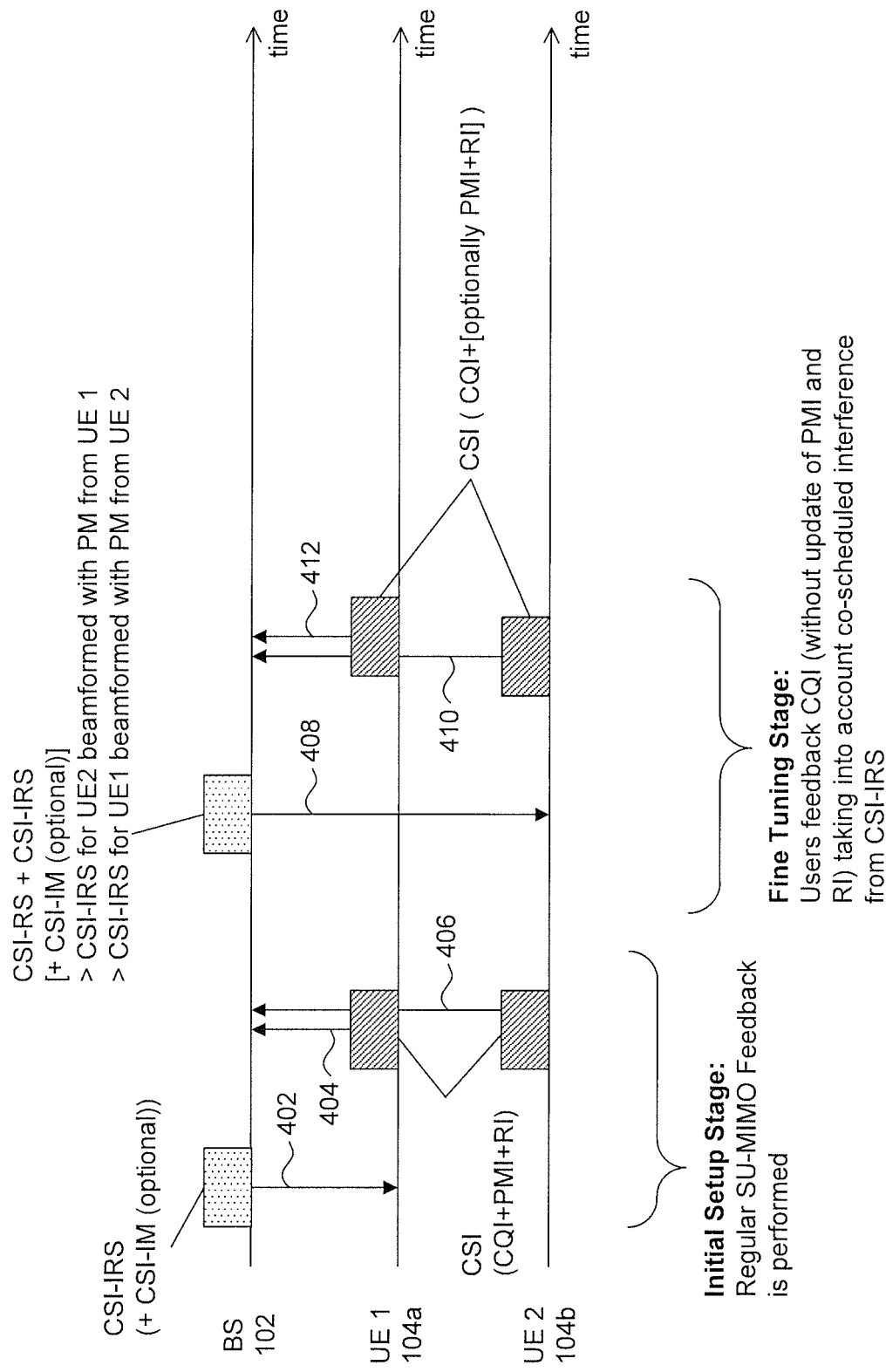
FIG. 4 is another example that illustrates a process for Multi-User MIMO (MU-MIMO) and/or Coordinate Beamforming (CB) according to an embodiment.

FIG. 4 is another example 400 that illustrates a process for MU-MIMO and/or CB according to an embodiment. Example 400 is provided for the purpose of illustration only and is not limiting of embodiments. For the purpose of illustration only, example 400 is described with respect to MU-MIMO, where a single base station 102 determines whether to use MU-MIMO transmission for a given physical resource element, and if MU-MIMO transmission is to be used, the UEs to be served by the MU-MIMO transmission.

As would be understood by a person of skill in the art based on the teachings herein, the process illustrated by example 400 can be readily extended to CB transmission, where multiple base stations jointly decide whether to use CB transmission, and if CB is to be used, the UEs to be served by the CB transmission.

For the purpose of illustration only, example 400 is described with respect to a scenario involving only two UEs 104a and 104b. As will be apparent to a person of skill in the art based on the teachings herein, the process illustrated by example 400 is not limited to example 400, and can be readily extended to more than two UEs as further described below. In other words, MU-MIMO transmission for UEs up to the maximum number of users allowed by the relevant standard can be performed using the process described herein.

As shown in FIG. 4, the process illustrated by example 400 can include an initial setup stage and an optional fine tuning stage. The initial setup stage includes steps 402, 404, and 406. Step 402 is similar to step 302 described above with reference to example 300, and includes configuring UEs 104a and 104b with CSI-RS. In response to this configuration, UEs 104a and 104b respond with respective CSI reports in steps 404 and 406 respectively. Steps 404 and 406 are similar to step 304 described above.

In an embodiment, based on the received CSI reports, base station 102 determines whether to perform MU-MIMO transmission, and if so, the UEs to include in the MU-MIMO transmission. In example 400, it is assumed that base station 102 has decided to perform MU-MIMO transmission for UEs 104a and 104b. In an embodiment, base station 102 subsequently proceeds to the fine tuning stage, in which the CQI for each UE can be updated based on the MU-MIMO transmission hypothesis. Specifically, in step 408, base station 102 configures each of UEs 104a and 104b with a modified CSI-RS process configuration, and then beamforms a respective CSI-IRS for each UE using the precoder matrix of the other UE. For example, base station 102 beamforms a CSI-IRS for UE 104a using the precoder matrix of UE 104b, and vice versa.

Using the beamformed CSI-IRS, as described above, UEs 104a and 104b estimate the interference due to each other in a potential MU-MIMO transmission and then send updated CSI reports to base station 102 in steps 412 and 410, respectively. In an embodiment, the updated CSI reports include updated CQIs based on the interference estimated from the CSI-IRS but assume the RI and PMI are maintained the same as in a previously reported CSI. The updated CQIs allow base station 102 to better adapt the links (e.g., select appropriate modulation and coding schemes (MCS)) to UEs 104a and 104b.

Figure 5:
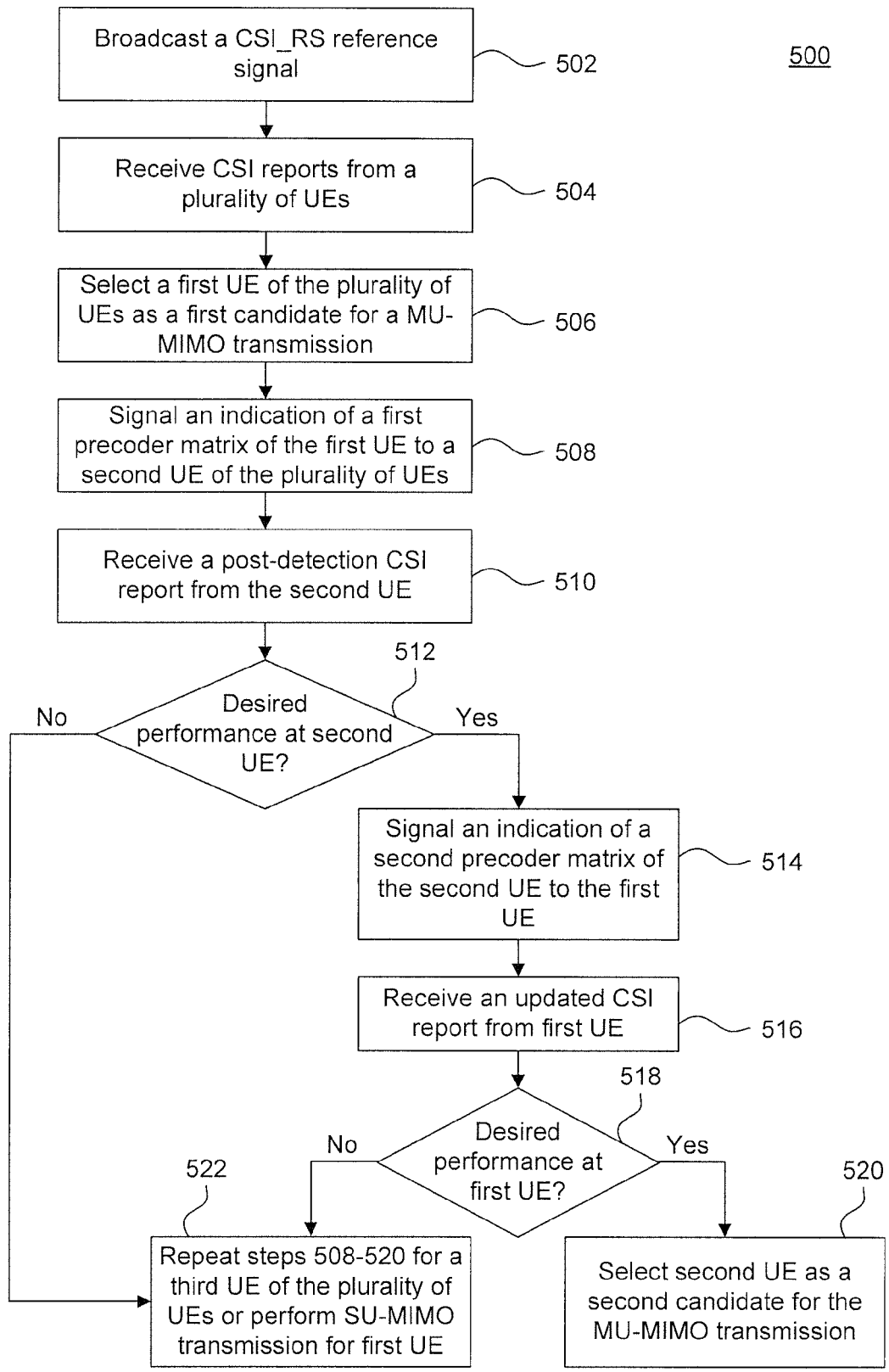
FIG. 5 is an example process according to an embodiment.

FIG. 5 is an example process 500 according to an embodiment. Example process 500 is provided for the purpose of illustration only and is not limiting of embodiments. Example process 500 can be performed by a base station, such as base station 102, to perform enhanced MU-MIMO and/or CB transmission.

As shown in FIG. 5, process 500 begins in step 502, which includes broadcasting a CSI-RS. As described above, the CSI-RS is a channel estimation reference signal that can be transmitted according to a pre-determined configuration, which is previously communicated to one or more UEs for the purpose of acquiring channel station information. In other embodiments, other types of reference signals (e.g., DM-RS) can also be used instead of a CSI-RS in step 502. In response to the broadcast of the CSI-RS, step 504 includes receiving CSI reports from a plurality of UEs.

Next, step 506 includes selecting a first UE of the plurality of UEs as a first candidate for an MU-MIMO transmission. In an embodiment, step 506 includes selecting the first UE as the first candidate for the MU-MIMO transmission responsive to a first CQI associated with the first UE being above a threshold.

Process 500 then proceeds to step 508, which includes signaling an indication of a first precoder matrix associated with the first UE to a second UE of the plurality of UEs. In an embodiment, step 508 includes signaling an index that identifies the first precoder matrix to the second UE. In another embodiment, step 508 includes beamforming, using the first precoder matrix, a second channel estimation reference signal (e.g., CSI-IRS) to the second UE. In a further embodiment, step 508 further includes signaling a CSI-RS configuration to the second UE, and beamforming the second channel estimation reference signal on a physical resource element indicated by the CSI-RS configuration.

Next, step 510 includes receiving a post-detection CSI report from the second UE. In an embodiment, the post-detection CSI report identifies a second CQI and a second precoder matrix associated with the second UE, computed under an assumption of a concurrent data transmission by the base station to the first UE using the first precoder matrix. In other words, the second CQI and the second precoder matrix are computed by the second UE under the assumption of an MU-MIMO transmission including the first UE and the second UE. In an embodiment, to enable the second UE to accurately determine the second CQI and the second precoder matrix, the base station signals to the second UE an EPRE ratio between the second channel estimation reference signal and the concurrent data transmission.

Subsequently, process 500 proceeds to step 512, which includes determining whether a desired performance is achievable at the second UE based on the second CQI. In an embodiment, step 512 includes comparing the second CQI to a threshold. If the answer to step 512 is no, process 500 proceeds to step 522 described below.

If the answer to step 512 is yes, process 500 proceeds to step 514, which includes signaling an indication of the second precoder matrix associated with the second UE to the first UE. In an embodiment, step 514 can be performed similarly to step 508 described above. Subsequently, step 516 includes receiving an updated CSI report from the first UE, which includes a third CQI and a third precoder matrix associated with the first UE. In an embodiment, both the third CQI and the third precoder matrix are computed under an assumption of a concurrent data transmission by the base station to the second UE using the second precoder matrix. In another embodiment, only the third CQI is computed under this assumption and the third precoder matrix is identical to the first precoder matrix associated with the first UE.

Next, process 500 proceeds to step 518, which includes determining whether the desired performance is achievable at the first UE based on the third CQI. If the answer to step 518 is yes, process 500 proceeds to step 520, which includes selecting the second UE as a second candidate for the MU-MIMO transmission. Otherwise, process 500 proceeds to step 522, in which the base station can either repeat steps 508 through 520 for a third UE of the plurality of UEs or decide to perform SU-MIMO transmission for the first UE.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments as other embodiments will be apparent to a person of skill in the art based on the teachings herein.

What is claimed is:

1. A base station comprising:
   radio frequency (RF) circuitry configured to transmit and receive wireless signals; and
   processor circuitry, coupled to the RF circuitry, configured to:
   broadcast a first channel estimation reference signal;
   receive Channel State Information (CSI) reports from a plurality of User Equipments (UEs) in response to the broadcast of the first channel estimation reference signal;
   select a first UE of the plurality of UEs, based on the CSI reports, as a first candidate for a Multi-User Multiple Input Multiple Output (MU-MIMO) transmission;
   signal an indication of a first precoder matrix associated with the first UE to a second UE of the plurality of UEs;
   beamform, using the first precoder matrix, a second channel estimation reference signal to the second UE; and
   receive a post-detection CSI report from the second UE in response to the beamform of the second channel information reference signal to the second UE.

2. The base station of claim 1, wherein the processor circuitry is configured to select the first UE as the first candidate for the MU-MIMO transmission responsive to a first Channel Quality Indicator (CQI) associated with the first UE being above a threshold.

3. The base station of claim 1, wherein the processor circuitry is configured to:
   beamform the second channel estimation reference signal on a physical resource indicated by higher layer signaling.

4. The base station of claim 1, wherein each CSI report from the plurality of UEs includes a first Channel Quality Indicator (CQI), and wherein the post-detection CSI report identifies a second CQI and a second precoder matrix associated with the second UE, computed under an assumption of a concurrent data transmission by the base station to the first UE using the first precoder matrix.

5. The base station of claim 4, wherein the processor circuitry is further configured to signal to the second UE an energy per resource element (EPRE) ratio between the second channel estimation reference signal and the concurrent data transmission.

6. A base station, comprising:
radio frequency (RF) circuitry configured to transmit and receive wireless signals; and
processor circuitry, coupled to the circuitry, configured to:
broadcast a first channel estimation reference signal;
receive Channel State Information (CSI) reports from a plurality of User Equipments (UEs) in response to the broadcast of the first channel estimation reference signal, wherein each CSI report from the plurality of UEs includes a first Channel Quality Indicator (CQI);
select a first UE of the plurality of UEs as a first candidate for a Multi-User Multiple Input Multiple Output (MU-MIMO) transmission;
signal an indication of a first precoder matrix associated with the first UE to a second UE of the plurality of UEs;
receive a post-detection CSI report from the second UE, wherein the post-detection CSI report identifies a second CQI and a second precoder matrix associated with the second UE, computed under an assumption of a concurrent data transmission by the base station to the first UE using the first precoder matrix;
determine whether a desired performance is achievable at the second UE based on the second CQI; and
if the desired performance is achievable at the second UE,
signal an indication of the second precoder matrix associated with the second UE to the first UE; and
receive an updated CSI report from the first UE, the updated CSI report including a third CQI and a third precoder matrix associated with the first UE.

7. The base station of claim 6, wherein the third CQI and the third precoder matrix associated with the first UE are computed under an assumption of a concurrent data transmission by the base station to the second UE using the second precoder matrix.

8. The base station of claim 6, wherein the third CQI is computed under an assumption of a concurrent data transmission by the base station to the second UE using the second precoder matrix, and wherein the third precoder matrix is identical to the first precoder matrix associated with the first UE.

9. The base station of claim 6, wherein the processor circuitry is further configured to:
determine whether the desired performance is achievable at the first UE based on the third CQI; and
if the desired performance is achievable at the first UE, select the second UE as a second candidate for the MU-MIMO transmission.

10. A method performed by a base station, comprising:
broadcasting a first channel estimation reference signal;
receiving Channel State Information (CSI) reports from a plurality of User Equipments (UEs) in response to broadcasting the first channel estimation reference signal, wherein each CSI report from the plurality of UEs includes a first Channel Quality Indicator (CQI);
selecting a first UE of the plurality of UEs as a first candidate for a Multi-User Multiple Input Multiple Output (MU-MIMO) transmission;
signaling an indication of a first precoder matrix associated with the first UE to a second UE of the plurality of UEs;

receiving a post-detection CSI report from the second UE, wherein the post-detection CSI report identifies a second CQI and a second precoder matrix associated with the second UE, computed under an assumption of a concurrent data transmission by the base station to the first UE using the first precoder matrix;
determining whether a desired performance is achievable at the second UE based on the second CQI; and
if the desired performance is achievable at the second UE,
signaling an indication of the second precoder matrix associated with the second UE to the first UE; and
receiving an updated CSI report from the first UE the updated CSI report including a third CQI and a third precoder matrix associated with the first UE.

11. The method of claim 10, wherein signaling the indication of the first precoder matrix to the second UE comprises beamforming, using the first precoder matrix, a second channel estimation reference signal to the second UE.

12. The method of claim 11, further comprising:
beamforming the second channel estimation reference signal on a physical resource element indicated by higher layer signaling.

13. The method of claim 10, wherein the third CQI is computed under an assumption of a concurrent data transmission by the base station to the second UE using the second precoder matrix, and wherein the third precoder matrix is identical to the first precoder matrix associated with the first UE.

14. The method of claim 10, further comprising:
determining whether the desired performance is achievable at the first UE based on the third CQI; and
if the desired performance is achievable at the first UE, selecting the second UE as a second candidate for the MU-MIMO transmission.

15. The method of claim 10, further comprising:
signaling to the second UE an energy per resource element (EPRE) ratio between the second channel estimation reference signal and the concurrent data transmission.

16. A base station, comprising:
radio frequency (RF) circuitry configured to transmit and receive wireless signals; and
processor circuitry, coupled to the RF circuitry, configured to:
receive, based on a first channel estimation reference signal, Channel State Information (CSI) reports from a plurality of User Equipments (UEs);
select a first UE of the plurality of UEs as a first candidate for a Multi-User Multiple Input Multiple Output (MU-MIMO) transmission based on the CSI reports;
beamform, using a first precoder matrix associated with the first UE, a second channel estimation reference signal to a second UE of the plurality of UEs; and
receive a post-detection CSI report from the second UE in response to the beamform of the second channel information reference signal to the second UE.

17. The base station of claim 16, wherein each CSI report from the plurality of UEs includes a first Channel Quality Indicator (CQI), and wherein the post-detection CSI report identifies a second CQI associated with the second UE, computed under an assumption of a concurrent data transmission by the base station to the first UE using the first precoder matrix.

18. The base station of claim 17, wherein the processor circuitry is further configured to:

select the second UE as a second candidate for the MU-MIMO transmission based at least in part on the second CQI associated with the second UE.

19. The base station of claim 17, wherein the processor circuitry is further configured to:

signal to the second UE an energy per resource element (EPRE) ratio between the second channel estimation reference signal and the concurrent data transmission.

20. The base station of claim 16, wherein the processor circuitry is configured to:

beamform the second channel estimation reference signal on a physical resource indicated by higher layer signaling.

\* \* \* \* \*

UNITED STATES PATENT AND TRADEMARK OFFICE
CERTIFICATE OF CORRECTION

PATENT NO. : 9,532,256 B2
APPLICATION NO. : 14/334340
DATED : December 27, 2016
INVENTOR(S) : Ariyavisitakul et al.

Page 1 of 1

It is certified that error appears in the above-identified patent and that said Letters Patent is hereby corrected as shown below:

In the Claims

In Column 13, Line 7, replace "to the circuitry" with --to the RF circuitry--.

Signed and Sealed this
Fourth Day of June, 2019

Andrei Iancu
*Director of the United States Patent and Trademark Office*